United States Patent [19]

Braithwaite et al.

[11] Patent Number: 5,249,888
[45] Date of Patent: Oct. 5, 1993

[54] ENHANCED GRADIENT SOIL AND GROUNDWATER REMEDIATION METHOD

[75] Inventors: Kathryn E. Braithwaite, Capistrano Beach; John F. Dablow, III, Huntington Beach, both of Calif.

[73] Assignee: Hughes Aircraft Company, Los Angeles, Calif.

[21] Appl. No.: 811,752

[22] Filed: Dec. 20, 1991

[51] Int. Cl.[5] .......................... E02D 3/11; B09B 3/00
[52] U.S. Cl. .................................... 405/128; 405/131
[58] Field of Search ............... 405/128, 129, 131, 258; 166/272

[56] References Cited

U.S. PATENT DOCUMENTS

| | | | |
|---|---|---|---|
| 4,842,448 | 6/1989 | Koerner et al. | 405/258 |
| 4,895,085 | 1/1990 | Chips | 405/128 X |
| 5,018,576 | 5/1991 | Udell et al. | 405/131 X |
| 5,076,727 | 12/1991 | Johnson et al. | 405/128 |

Primary Examiner—David H. Corbin
Attorney, Agent, or Firm—Elizabeth E. Leitereg; Terje Gudmestad; W. K. Denson-Low

[57] ABSTRACT

An enhanced pressure gradient remediation system (10) for decontaminating a contaminated volume of soil incorporates at least one extraction well (40) operated independently or in conjunction with at least one injection well (12). The injection well (12) is employed to inject steam, or ambient or heated air, into the soil, and extraction probe (40) extracts fluids, contaminants (30,32,34) and possibly groundwater (58) from the soil. The invention further contemplates injection and extraction by means of recoverable extraction and injection probes (14) which obviate the need for permanent wells. The enhanced pressure gradient results from employing extraction in possible conjunction with injection at higher vacuum and pressure than previously known in the art.

4 Claims, 2 Drawing Sheets

ENHANCED GRADIENT SOIL AND GROUNDWATER REMEDIATION METHOD

BACKGROUND OF THE INVENTION

1. Technical Field

This invention relates generally to a system for decontaminating a contaminated volume of soil, and more particularly to an enhanced pressure gradient remediation system.

2. Discussion

Soil and groundwater purity has become an important environmental issue. Enormous amounts of contaminants now pollute numerous toxic sites. Spurred by federal legislation, a massive clean-up is underway.

A contaminated volume of soil is generally characterized by trapped lenses of contaminants located above the water table level, at or near the water table level, or below the water table level. There may also be residual contamination of lower concentrations of contaminants trapped within the pores of the soil. Liquid contaminants which are heavier than water move downward into the capillary fringe in the water table while liquids lighter than water tend to spread laterally when they encounter the fringe of the water table.

One method for cleaning up contaminated sites consists of removal of the contaminated soil. This method is bulky, impractical and slow. Another method is groundwater extraction to remove residual contamination. Groundwater withdrawal is intended to depress the water table in order to recover the spill, such as gasoline, in a separate phase. However, groundwater extraction is inefficient. However, the amount of free product typically recovered by this method is significantly less than the estimated amount of the spill. It cannot be predicted beforehand how much water must be pumped, for how long, or whether the pumping will be effective. Groundwater extraction may also require additional equipment such as down-hole pumps or entrainment tubes.

Contaminated soil is typically decontaminated by installing at least one permanent extraction well connected to a vacuum pressure. This vacuum pressure is typically measured in terms of inches of water. This type of vacuum extraction is effective on volatile compounds, such as gasoline or solvents, and partially effective on semi-volatile compounds, such as diesel fuel. The effectiveness of a vacuum extraction system on semi-volatile compounds is on the order of 30%. Pure vacuum extraction only volatilizes compounds with particular vapor pressures, or Henry's constants. Typical in-situ vacuum extraction systems have limited success in finely-grained soils, require over 12 months of operating time and typically can only reduce concentrations of volatile contaminants in the soil to approximately 10 parts per million.

Another technique is the injection of steam into the sub-surface to create a positive pressure gradient as well as increased sub-surface soil temperature to remove volatile and semi-volatile compounds. Steam enhanced extraction can remove other, less volatile compounds than vacuum extraction alone, but has not utilized high vacuum to forcibly assist the migration of sub-surface contaminants toward the extraction wells. The steam injection is also generally performed through permanent wells.

As a result, existing technologies have required enormous capital expenditures for permanent wells, treatment of the entire contaminated area at the same time, and over 12 months of operating time. Permanent wells are more costly to install, more difficult and costly to abandon, and limit flexibility.

SUMMARY OF THE INVENTION

According to a preferred embodiment of the present invention, an enhanced pressure gradient system is disclosed incorporating at least one injection well by which steam is injected into a contaminated volume of soil, and at least one extraction well by which the steam, other fluids, and contaminants are extracted from the soil. The system employs a greater pressure gradient than is known in the art, resulting from high pressure injection and vacuum. The present invention may also be practiced by utilizing high vacuum independently or in conjunction with high pressure injection of ambient or heated air or stream, and may be coupled with groundwater extraction. The enhanced pressure gradient remediation increases the rate at which contaminants migrate towards the extraction wells, thereby decreasing the time required to complete remediation.

Accordingly, it is an object of the present invention to provide an enhanced pressure gradient remediation system for effectively decontaminating a contaminated volume of soil.

It is a further object of the present invention to provide a portable enhanced pressure gradient remediation system, utilization at least one probe removably drilled into the soil.

Additional objects, advantages and features of the present invention will become apparent from the following description and appended claims, taken in conjunction with the accompanying drawings.

DETAILED DESCRIPTION OF THE PREFERRED EMBODIMENTS

The following description of the preferred embodiments is merely exemplary in nature and is in no way intended to limit the invention or its application or uses.

According to a preferred embodiment of the present invention there is disclosed an enhanced pressure gradient remediation system for decontaminating a contaminated volume of soil.

Figure 1:
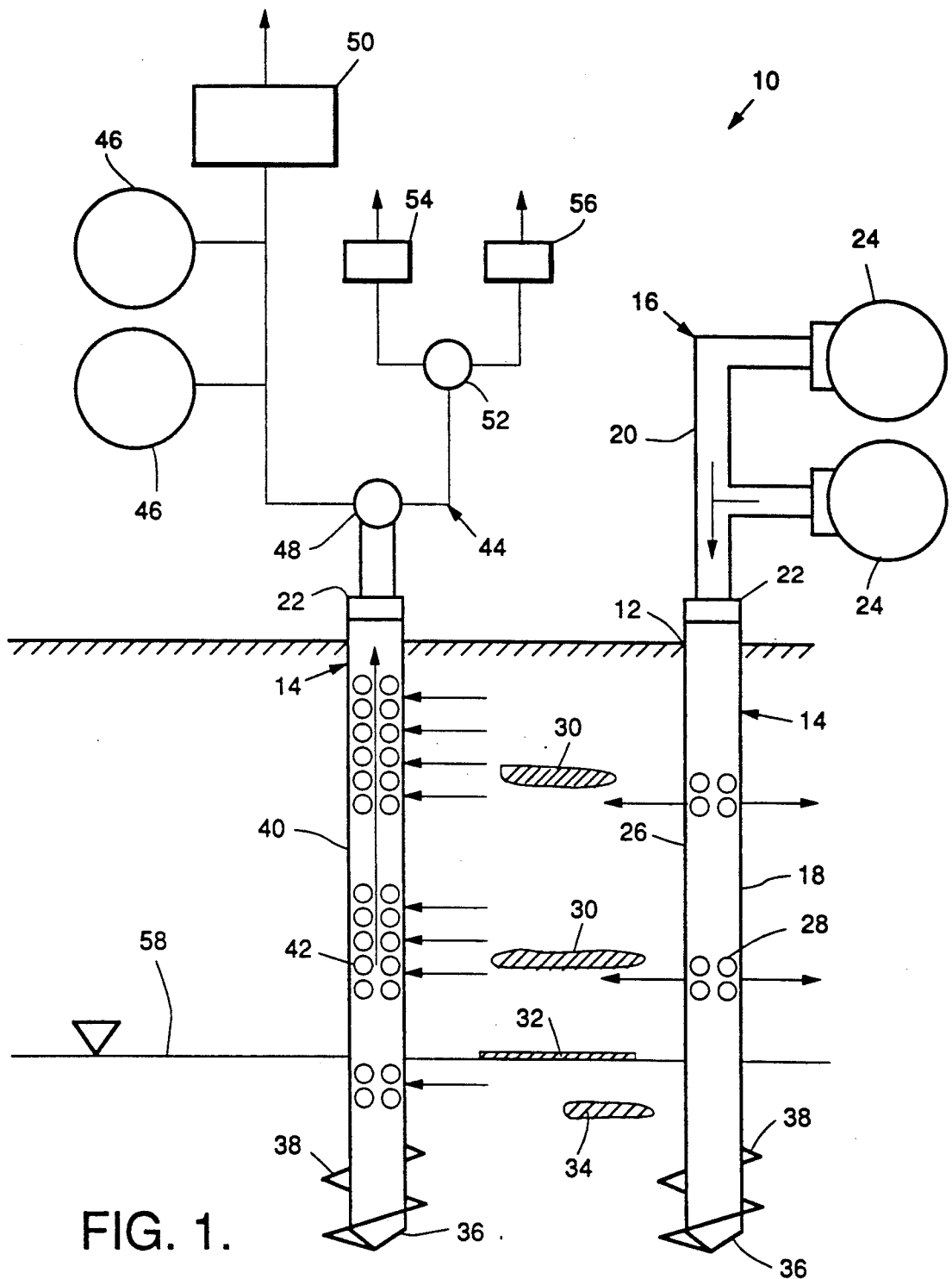
FIG. 1 is a decontamination system for a contaminated volume of soil according to a preferred embodiment of the present invention.
Figure 2:
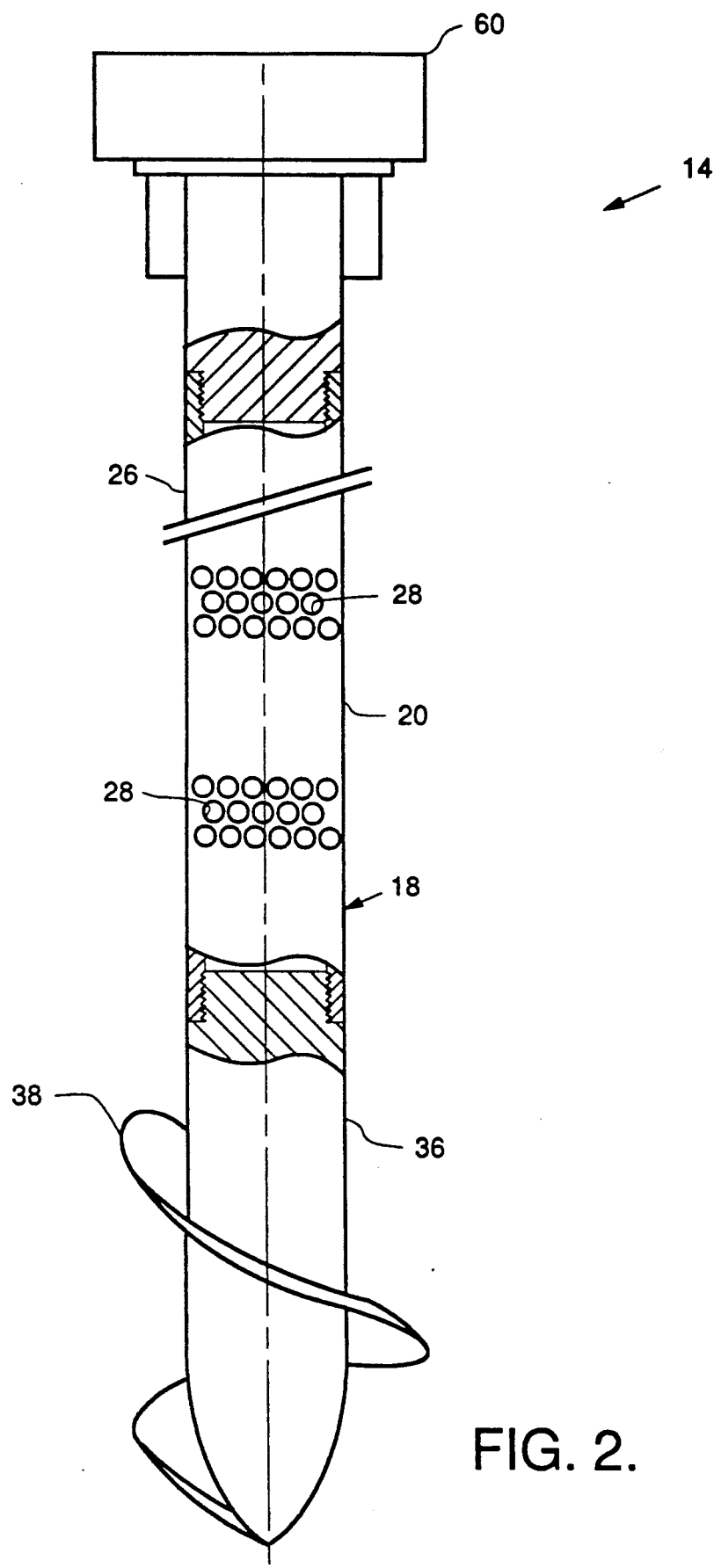
FIG. 2 is an extraction and injection probe according to a preferred embodiment of the present invention.

Referring to the drawings, FIG. 1 shows an enhanced gradient remediation system 10 according to a preferred embodiment of the present invention. The system 10 includes an injection well 12 for injecting pressurized fluid into the soil. The injection well 12 may be a conventional permanent well, or preferably a recoverable extraction and injection probe 14 which can be used for either injection or extraction of fluids.

The injection probe 18 is constructed of an elongated hollow tube 26 having apertures 28 formed to allow flow of fluids in a generally horizontal direction. The apertures 28 are preferably located at levels below the depth of the contaminants 30,32 because the relatively hot steam will rise as it passes horizontally through the soil. The probe 18 further has a point 36 with auger flights 38 to allow the probe 18 to be removably drilled into the soil.

The probe 18 is installed as follows. The point 36 is affixed to the lower end of a preferably five foot long tubular section. The upper end of the hollow tube 26 is affixed to a drive means 60 operative to rotate the probe 18 and drill it into the soil. The drive means 60 may be a conventional drill rig as is known in the art. The drive means 60 is utilized to drill successive tubular sections into the soil. The drive means 60 is removed from the hollow tube 26, and either a fluid injection system 16 or a fluid extraction system 44 is attached. Following remediation of the soil, the probe 18 is removed by a process in reverse of that disclosed above.

A fluid injection system 16 is connected to the injection probe 18 by tubes 20 and a coupling 22, and includes at least one steam boiler 24. The steam should preferably be injected at a pressure substantially within the range of 10 to 60 pounds per square inch, or 20 to 125 inches of mercury. Fluid injection pressures have previously been measured in terms of inches of water. The present invention thus contemplates much greater pressure than the prior art. If the injection medium is steam, it may also be injected below the surface of any groundwater.

In an alternative embodiment, the fluid injection system 16 may be operated to inject ambient or heated air.

The enhanced gradient remediation system 10 further includes an extraction probe 40 for extracting fluid and contaminants from the soil. The extraction may also be performed by a conventional permanent well. The extraction probe 40 is substantially similar to the injection probe 18, except that the extraction probe 40 is preferably formed with apertures 42 more generally around the depth of the contaminants 30,32,34.

A fluid extraction and treatment system 44 is connected to the extraction probe 40 by tubes 20 and a coupling 22. The extraction is preferably conducted by a vacuum substantially within the range of 5 to 30 inches of mercury. Again, this vacuum pressure is much higher than any known in the art. The enhanced pressure gradient results in faster remediation of the soil. In addition, the enhanced pressure gradient as well as the steam front washes or flushes the soil, remediating a greater variety of contaminants more effectively.

Fluids and contaminants in the soil are drawn through the apertures 42 from the soil into the probe 40. Vacuum blowers 46 operating substantially within the range of 5 to 30 inches of mercury pull the extract through the probe 40, the coupling 22, and a liquid-vapor separator 48. The vapor is drawn by the vacuum blowers 46 into a vapor treatment system 50. The liquid proceeds through a separation tank 52, where water is removed and then treated by a treatment system 54. The remaining free product is stored and recycled 56.

In an alternative embodiment, the extraction probe 40, fluid extraction system 44, and separation filters 48,52 and treatment systems 50,54,56 are operated independently, in the absence of any fluid injection 16. This embodiment may also correspond to operation of a combined injection and extraction system wherein the injection is temporarily halted.

In another alternative embodiment, the extraction of fluid and contaminants from above the groundwater level is accompanied by groundwater extraction 58.

The proper selection of which embodiment to employ will depend upon various site-specific factors, such as groundwater level, depth and types of contaminants, and porosity of the soil.

Enhanced gradient remediation is effective on volatile and semi-volatile compounds, even in finely-grained soils. The recoverable extraction and injection probes obviate the need for permanent wells. Utilization of probes makes the entire system portable, which permits remediation by a batch treatment approach and greatly reduces capital expenditures required for permanent technologies.

The high pressure steam injection creates a steam front which forcibly washes or flushes the soil. As the steam passes through the soil, the contaminating substances 30,32,34 are carried conjunctively along with the steam in a substantially horizontal direction from the injection probe 18 towards the extraction probe 40. The relatively hot steam will also rise as it passes through the soil. The high vacuum extraction of the extraction probe 40 acts to forcibly draw the injection fluid, preferably steam, and the contaminating substances 30,32,34 toward the extraction probe 40.

As is apparent, an unlimited number of configurations of the probe can be realized and still satisfy the requirements described above. The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An enhanced method for decontaminating a contaminated volume of soil, the method comprising the steps of:
    a) inserting at least one injection probe into said soil such that a portion of said injection probe is located approximately within said contaminated volume of said soil;
    b) inserting at least one extraction probe into said soil such that a portion of said extraction probe is located approximately within said contaminated volume of soil and spaced apart from said injection probe, wherein said injection probe and said extraction probe comprise elongated hollow tubes with apertures formed to allow the flow of fluids in a substantially horizontal direction, said apertures located within said contaminated volume of soil;
    c) concurrently injecting a pressurized fluid into said injection probe with a relatively high injection pressure substantially within the range 20–120 inches of mercury and applying a vacuum to said extraction probe with a relatively high vacuum substantially within the range of 5–30 inches of mercury;
    d) removing said pressurized fluid and said contaminating substance from said extraction probe, whereby said pressurized fluid and said contaminating substance within said contaminated volume of soil are rapidly and forcibly drawn through said contaminated volume of soil in said substantially horizontal direction from said injection probe toward said extraction probe; and
    e) removing said injection probe and said extraction probe from said decontaminated soil.

2. The method according to claim 1, further comprising the additional steps of:

e) separating said pressurized fluid and said contaminating substance into component parts of liquid and vapor; and f) treating said vapor and treating said liquid.

3. The method according to claim 1, wherein said step c) is performed with a heated pressurized fluid, such that said volume of soil is concurrently heated.

4. The method according to claim 3, wherein said heated pressurized fluid is steam.

* * * * *